June 18, 1968     J. E. CLEMENS     3,389,250

MULTIPLE CHAMBER LIQUID LEVEL PROBE

Filed April 20, 1964

INVENTOR.
JOHN E. CLEMENS
BY
James J. O'Reilly
AGENT

3,389,250
MULTIPLE CHAMBER LIQUID LEVEL PROBE
John E. Clemens, Xenia, Ohio, assignor to Industrial Nucleonics Corporation, a corporation of Ohio
Filed Apr. 20, 1964, Ser. No. 361,032
11 Claims. (Cl. 250—43.5)

This invention relates generally to liquid level gauges and more particularly to a compact radiation measuring probe providing liquid level information in a form readily accepted by digital processing equipment thereby eliminating complicated calibration procedures associated with analog devices providing a similar function.

Radiation liquid level gauges in the past have been bulky devices often lacking in sensitivity. Some have been non-contacting devices in which a source of radiation is mounted on the outside of a vessel and a detector such as a Geiger-Meuller tube is placed on an opposite wall of the vessel. Large vessels require the use of highly active source material, creating a health hazard for operating personnel unless extensive shielding is used. These measuring systems are usually analog devices requiring extensive calibration and linearization procedures. Moreover, since most data handling systems require input data in digital form, some kind of analog-to-digital conversion must be used between the gauge and the data processor.

One type of digital liquid level gauge that is inserted directly in the liquid is described in U.S. Patent 2,933,601 issued Apr. 19, 1960, to H. Friedman. The patentee provides a plurality of detector tubes stacked in vertical alignment, each of which is connected to an indicator bulb. Integral with the stacked detector tubes is an elongated source that is mounted parallel to the tubes but spaced therefrom. The source-detector tube mounting assembly is supported in the vessel whose liquid level is to be measured. The liquid flows between the source and those detector tubes situated below the interface and causes the indicator bulbs associated with these tubes to be extinguished. The lowest bulb lit is located at the level of the liquid. With this gauge the size of the tubes commercially available limits the smallest incremental change in fill height that can be resolved.

My invention comprises a cylindrical probe having a plurality of collecting rings surrounding a central electrode coated with a suitable radioisotope such as strontium 90. Each ring combined with the center electrode constitutes an ionization chamber. An operating potential is impressed on the center electrode and the rings. The radiation field produced by the radioisotope is absorbed by the liquid and causes current to flow only in those rings located out of the liquid. By summing the ring currents, I obtain a signal whose amplitude increases step-wise as the liquid level drops in the probe.

The probe can be made of light-weight plastic material suitable for insulating one ring from another. Moreover, the rings can be deposited by a metallic evaporation technique to obtain not only a better resolution of the actual fill height but also a thin-wall construction, thereby reducing the physical size and weight of the probe. Since the source of radiation is substantially surrounded by the rings and plastic supporting walls, virtually all threat of a radiation hazard is eliminated even when the probe is removed from the vessel.

My transducer is simply and cheaply fabricated without sacrificing sensitivity or accuracy and features a compact assembly that can be inserted in vessels or tankages of various configuration. In some cases, the transducer itself may comprise the vessel that retains the liquid to be measured. For example, in my copending application Ser. No. 361,060 filed Apr. 20, 1964, and assigned to the same assignee as the present invention, I illustrate a zero-G fuel gauge in which a small hollow cylindrical baffle extends over the pumping outlet of a rocket fuel tank. Under zero-G conditions, the fuel is confined to the baffle and my level detection system indicates the amount of fuel therein. Since the maximum size of my transducer is limited because of the difficulty in establishing a sufficient electric field across large measuring gaps and because of radiation absorption occurring above the interface, it is most suitable as a probe that can be inserted in any vessel whose fill height is to be measured.

Accordingly, it is a primary object of the present invention to provide an improved liquid level gauge that is more compact than similar devices used heretofore.

It is another object of the present invention to provide an improved nuclear liquid level gauge that can be readily fabricated of inexpensive and lightweight materials.

It is also an object of the present invention to provide an improved nuclear liquid-level gauge that provides an output signal convenient for transmission to data processing equipment.

It is yet another object of the present invention to provide an improved nuclear liquid level gauge that does not require complicated calibration or linearization procedures for proper operation.

These and other objects and advantages of my invention will become more apparent from the following description taken together with the accompanying drawings, in which.

Figure 1:
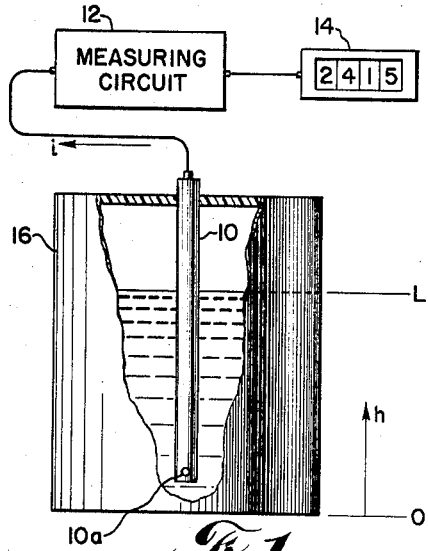
FIG. 1 is a diagrammatic view, partly in section, of a liquid level measuring system in accordance with my invention.

With reference now to the drawings and particularly to FIG. 1, my measuring system includes a liquid level probe having a housing 10, a measuring circuit 12 and a level indicator 14. The probe has openings 10a that allow the liquid to be measured to flow into the housing. The probe provides an electrical current $i$ the amplitude of which decreases stepwise as the liquid level $h$ rises in the vessel 16 in a manner described hereinafter.

Figure 3:
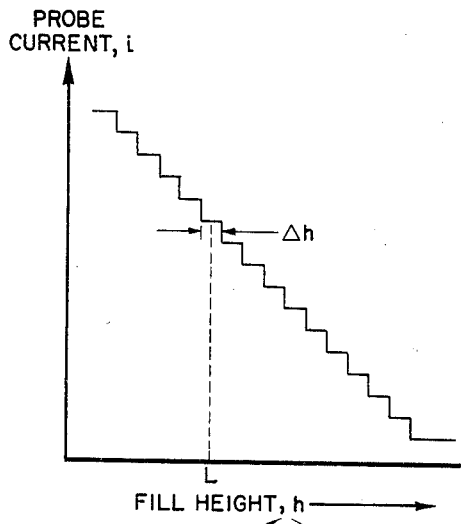
FIG. 3 is a graph illustrating the step-wise response of the probe shown in FIG. 2 to liquid level.
Figure 2:
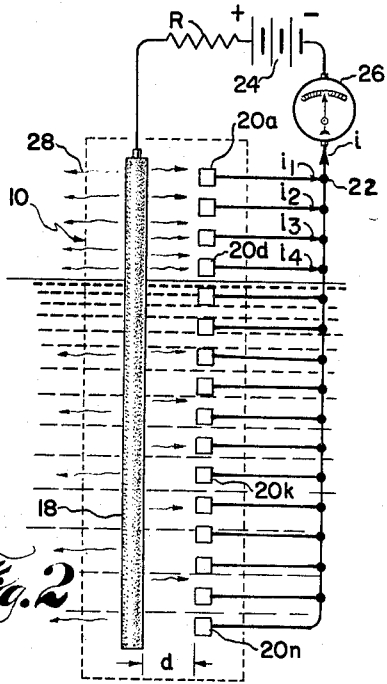
FIG. 2 is a schematic circuit diagram showing one type of probe construction useful in the system of FIG. 1.

Referring to FIG. 2, the probe comprises a longitudinally extending electrodes wire or rod 18 coated with a radioisotope such as strontium 90 or radioactive by other means and a plurality of vertically aligned conductor blocks 20a–20n spaced a short distance $d$ from the radioactive electrode 18. The electrodes are supported by the housing 10 shown for simplicity in dotted outline. Alternatively, the electrode 18 could either be made hollow for enclosing a gaseous isotope such as krypton 185 or it could be radioactively contaminted in a nuclear reactor. The block electrodes are essentially connected together to a common junction 22. A battery 24 is connected in series with a microammeter 26 and a current limiting resistance R. The series connection is then connected between the center electrode 18 and the block electrode common junction 22. This establishes an electric field between the two electrode types that will result in current flow providing that the radiation field, denoted by the curvilinear lines 28, ionizes the medium located therebetween thereby increasing its electrical conductance. The radiation 28 produces ion pairs which recombine more slowly in the vapor above the liquid than in liquid itself. As a result, ring currents $i_1$, $i_2$, $i_3$, and $i_4$ flow in the top four block electrodes 20a–20d to form the sum current $i$ registered by the meter 26. The resistivity of the liquid being measured is quite high relative to that of the vapor so that the current in the rest of the rings is several orders of magnitude less. As the liquid rises, the incremental current falls according to the step function shown in FIG. 3. The minimum resolvable rise increment $\Delta h$ is fixed by the physical size and spacing of the block electrodes $20a$–$20n$. It is possible to measure with my device down to within 0.01 of an inch of the fill level. If it is only required to know when the liquid level passes a given height, a single block electrode and short length of radioactive electrode positioned at that height will suffice.

Figure 4:
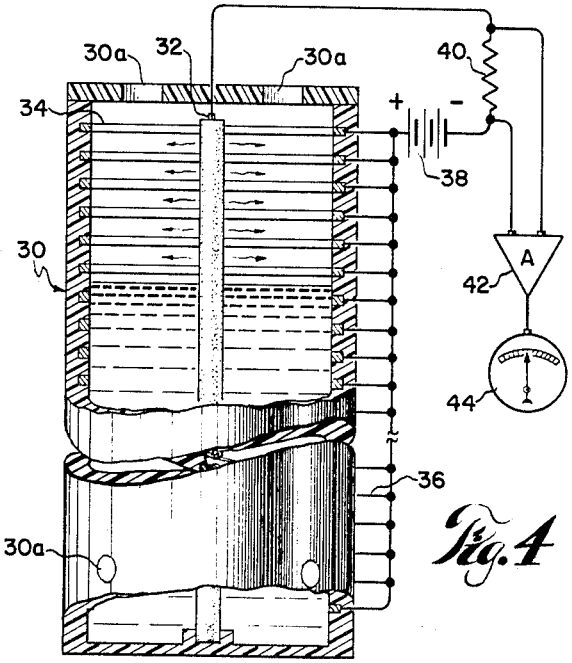
FIG. 4 is a section view showing an alternative probe construction.

Having set forth the basic construction of my invention, I will now describe in FIG. 4 an alternative probe 30. A tubular probe body 30 of plastic or other synthetic lightweight material supports a center electrode 32 and carries a plurality of ring electrodes 34 down the inside thereof. The rings may be either mounted in grooves cut in the inside wall of the body 30 or they may be vapor-deposited by known evaporation techniques. Both the base of the cylindrical body 30 and the top may be covered by plastic end pieces to absorb any radiation likely to pass to the outside of the probe body and cause a radiation hazard. Holes $30a$ near the top and bottom of the probe permit fluid to enter for measurement. The ring electrodes are all tied together by wires 36 that may be imbedded in the wall of the probe. As an example, using one curie of nickel 63 and a two-inch probe, 40 inches long with 400 rings each slightly less than 0.1 inch high, and impressing a potential of 300 volts across the electrodes, I can accurately measure the fill height of RP-1 rocket fuel or any fuel having a high resistivity. The nickel isotope provides a peak beta ray energy of 0.067 mev. The fuel is usually pressurized with nitrogen gas which absorbs most of this radiation in one inch of penetration depth.

My invention requires that the resistance of the fuel between the inner and outer electrodes be several times greater than that of the vapor above the interface. If a center electrode radius of .025 inch is used the resistance in the fuel is approximately $2 \times 10^{16}$ ohms. Assuming a source distribution of 0.1 curie of Ni-63 per 4 inch length of center electrode, the resistance above the interface is about $0.4 \times 10^{10} \Omega$. Accordingly, there is a difference of six orders of magnitude between the magnitude of the currents flowing in the submerged rings than in those not. Alternatively it can be said that the electrical conductance of the region above the interface is much greater than that below.

Instead of using a microammeter 26 to measure these small electrical currents, it may be preferable to use a more sensitive current measuring system. Briefly, the current is made to flow through a very high resistance element 40 in order to develop a measurable potential. This potential is amplified and indicated by an electrometer amplifier 42 and meter 44. Alternatively, it may be desirable to use the null balance measuring technique described in U.S. Patent 2,790,945 issued Apr. 30, 1957 to H. R. Chope and assigned to the same assignee as the present invention. In this system, an electromechanical feedback is used around the electrometer amplifier and a chart recorder displays the value of the current from the ion chamber that flows through the high resistance element 40.

The cylindrical construction is particularly useful in the rocket fuel measuring system described in my copending application supra. In this application, the probe itself comprises the vessel used to contain the fuel.

Other geometrical configurations could be used in place of the concentric cylindrical type illustrated in FIG. 4. The inner electrode may be mounted anywhere inside of the rings and the probe may be of square, rectangular or elliptical cross-section. Moreover, the rings need not completely surround the center electrode and a gamma source of radiation may be used on the center electrode. The rings could be coated instead, but this may create an objectionable external radiation field. Moreover, the center electrode can be easily shielded by dropping a small shield down the outside thereof but, if the rings are coated with radioactive material, both sides of the probe wall must be covered to completely shield the device.

Figure 5:
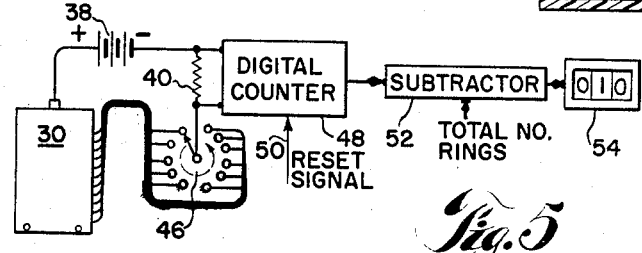
FIG. 5 is a schematic circuit diagram of an alternative digital liquid level measuring system.

In FIG. 5, digital readout is accomplished by scanning each ring in succession with a rotating switch 46. A digital counter 48 will register whenever a ring out of the liquid is scanned. The number indicated can be subtracted at 52 from the total number of rings. The display device 54 registers the number of rings submerged and is thus indicative of the liquid fill level. The counter can be cleared each cycle over line 50 when all of the rings are scanned. It will not be necessary to scan any further than the first submerged ring, unless there is a bubble in the tank below the interface which must be located.

Many other modifications may be made to my preferred embodiment without departing from the true spirit and scope of the present invention or relinquishing any of the advantages attendant thereto.

I claim:
1. Material level sensing apparatus comprising:
   a probe constructed and arranged to be partially submerged in said material and having
      a first electrode emitting nuclear radiation and extending down the length of said probe and
      a plurality of vertically aligned second electrodes spaced from said first electrode to permit said material to flow in between, said nuclear radiation establishing an ionization region between said first and said second electrodes to provide a current flow between said first electrode and each of said second electrodes in accordance with the electrical conductance of said region,
   circuit means responsive to said current flow for measuring the electrical conductance of the region located between each of said second electrodes and said first electrode,
   said conductance being significantly different when said material occupies said region than when it does not, and
   means for examining the conductance of each of said ionization regions to determine the level at which said conductance changes.

2. A fill height gauge for a vessel having upright walls for containing a liquid comprising:
   radiation probe means including
      a housing for extending down into said vessel and having openings allowing said liquid to flow freely thereinto partially submerging said housing,
      a plurality of outer electrodes supported in vertical alignment by said housing, and
      an inner electrode emitting radiation toward said outer electrodes,
   means for impressing an electrical potential between said inner electrode and each of said outer electrodes,
   said potential causing a current to be conducted only in those of said outer electrodes not submerged in said liquid, and
   means for indicating the number of said conducting electrodes.

3. A gauge as set forth in claim 2 in which said last named means comprises:
   means for scanning said outer electrodes in succession to obtain a pulse whenever a current generating electrode is scanned, and
   means for counting said pulses to provide an indication of the total number of said outer electrodes not submerged in said liquid.

4. A gauge as set forth in claim 2 which further includes means for summing said currents flowing in said conducting electrodes.

5. Apparatus for sensing the level of material in a vessel comprising:

a probe arranged to be partially submerged in said material and including a first electrode for extending down the length of said vessel and a plurality of second electrodes spaced from said first electrode to allow said material to flow in between, means for impressing an electric field between said first electrode and each of said second electrodes, means for positioning a source of nuclear radiation to establish an ionization region betwen said first electrode and said second electrodes to cause an electrical current to flow only in those of said second electrodes that are not submerged in said fill material, and means responsive to said flow of electrical currents for indicating the level of said material in said probe.

6. Apparatus for measuring the amount of fill material in a vessel comprising:

a probe having a first electrode for extending into said fill material and a plurality of second electrodes partialy submerged in said fill material, said second electrodes being spaced from said first electrode and vertically aligned to define a measuring region of vertical extent, means for establishing an electric field between said electrodes, a radioisotope coating on one of said first electrode and said plurality of second electrodes with a radioisotope for ionizing said interelectrode measuring region only in those areas not occupied by said fill material to cause a substantial flow of electrical current across said measuring region, and means for utilizing said current flow to indicate the amount of said material in said vessel.

7. Apparatus as set forth in claim 6 which further includes means responsive to said current flow for providing a digital indication of the number of said second electrodes submerged in said fill material.

8. Apparatus as set forth in claim 6 which further includes means for summing said electrical currents flowing in said conducting electrodes, and means responsive to said summed current flow for indicating the extent to which said probe is submerged in said fill material.

9. Apparatus for sensing the level of material in a vessel comprising:

a probe including a cylindrical housing of insulative material for extending down the length of said probe, an electrode axially positioned within said housing and bearing a radioactive material, a plurality of annular rings concentrically positioned with respect to said electrode and spaced down the length of said housing, means for connecting said rings in parallel, a source of electrical potential connected between said electrode and said rings connected in parallel to cause an electrical current to flow in each of said rings not submerged in said material, and means responsive to the total flow of current in said rings for indicating the level of said material within said housing.

10. Apparatus as set forth in claim 9 in which each of said rings is a metal coating on the inner surface of said cylindrical housing.

11. Apparatus for sensing the level of material in a vessel comprising:

a probe including a cylindrical housing of insulative material for extending down the length of said probe, an electrode axially positioned within said housing and bearing a radioactive material, a plurality of annular rings concentrically positioned with respect to said electrode and spaced down the length of said housing, a source of electrical potential connected between said electrode and said rings connected in parallel to cause an electrical current to flow in each of said rings not submerged in said material, means for scanning said rings and generating a pulse for every ring providing a flow of current, means for counting said pulses to provide a digital signal proportional to the total number of rings not submerged in said material, means for subtracting said total submerged ring count from the total number of rings to obtain a difference count, and means for indicating said difference count.

References Cited

UNITED STATES PATENTS

| | | | |
|---|---|---|---|
| 2,933,601 | 4/1960 | Friedman | 250—43.5 |
| 3,010,320 | 11/1961 | Sollecito | 73—304 |
| 3,233,100 | 2/1966 | Lampart | 250—44 |

ARCHIE R. BORCHELT, *Primary Examiner.*